(12) United States Patent
Biot

(10) Patent No.: US 6,503,613 B1
(45) Date of Patent: Jan. 7, 2003

(54) DRY FRICTION CLUTCH LINER CROWNS, AND METHODS OF MAKING THEM

(75) Inventor: Christian Biot, LePalais sur Vienne (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/335,025

(22) Filed: Jun. 17, 1999

(30) Foreign Application Priority Data

Jun. 17, 1998 (FR) .............................................. 98 07657

(51) Int. Cl.[7] .............................................. B32B 25/02
(52) U.S. Cl. ................. 428/293.4; 428/294.1; 428/294.7; 428/297.4
(58) Field of Search .......................... 428/293.4, 294.1, 428/294.7, 64.1; 106/36; 156/166, 176, 180

(56) References Cited

U.S. PATENT DOCUMENTS

| 4,118,528 A | 10/1978 | Lowry |
| 4,130,537 A | 12/1978 | Bohrer |
| 4,320,823 A | * 3/1982 | Covaleski |
| 4,476,191 A | 10/1984 | Girgis |

FOREIGN PATENT DOCUMENTS

| EP | 0 010 956 | 5/1980 |
| FR | 2 379 563 | 9/1978 |
| GB | 2 203 746 | 10/1988 |

OTHER PUBLICATIONS

French Search Report dated Mar. 1999.

* cited by examiner

*Primary Examiner*—Rich Weisberger
(74) *Attorney, Agent, or Firm*—Morgan & Finnegan, LLP

(57) ABSTRACT

A friction liner for a dry friction clutch for a motor vehicle comprises a friction material made by a method which includes the impregnation of a mineral fiber based yarn with an aqueous impregnating cement, which contains latex and a phenolic resin which is at least partly in the form of a phenolate.

9 Claims, 3 Drawing Sheets

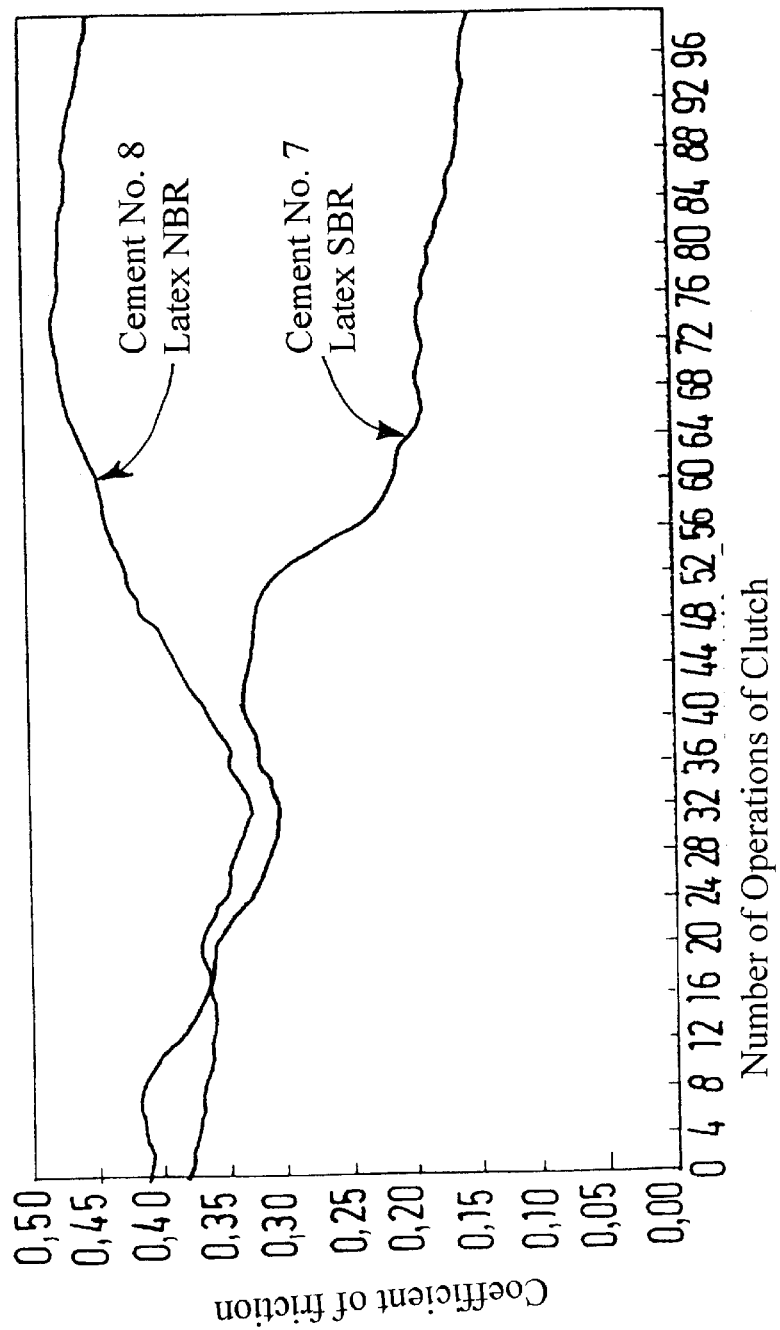
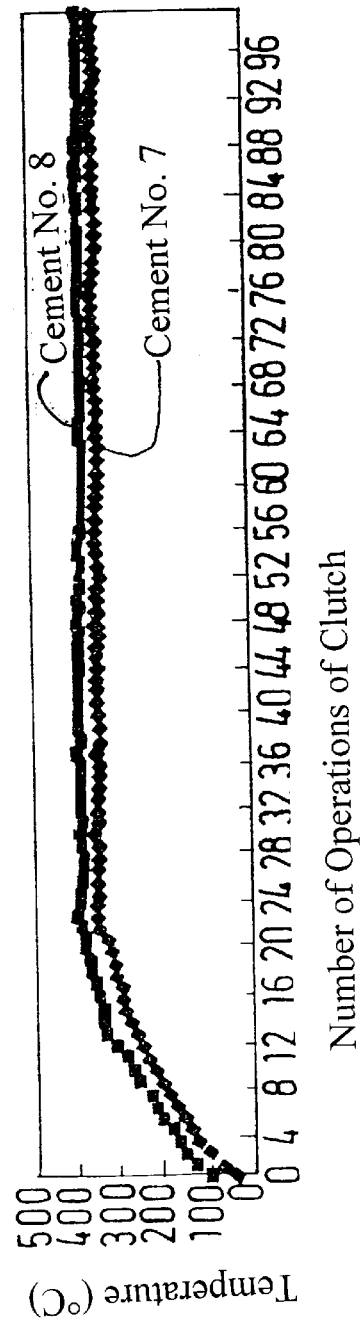
FIG.3
FIG.4

DRY FRICTION CLUTCH LINER CROWNS, AND METHODS OF MAKING THEM

FIELD OF THE INVENTION

The present invention relates to methods of making friction materials, and more particularly friction materials for a friction crown, or crown shaped friction liner, for a clutch friction wheel or friction disc, designed for dry operation. The invention equally relates to such a friction crown itself.

BACKGROUND OF THE INVENTION

A friction crown of the above type is made from a yarn which is based in particular on mineral fibres such as glass fibre. This provides mechanical strength against the centrifugal force which occurs during operation of the friction crown. The basis of the friction crown material also includes rubber in order to give a good coefficient of friction, and includes various fillers and a binder, which in practice is a phenolic resin, in order to provide cohesion between the various constituents.

During manufacture of the crown, it is usual to make use of various solvents, to dissolve the rubber. These solvents are chlorinated solvents which disadvantageously are noxious and consequently make it necessary to perform operations to confine the process within the production line and to recover the resulting vapours, to prevent any contact between the operators working on the manufacture and any release of noxious vapours into the atmosphere.

It has previously been proposed to make use of aqueous solvents to replace the chlorinated solvents. This does however make it necessary to use latex as well as rubber. In practice, an aqueous cement is made which results from the mixture of phenolic resins, fillers and latex in water. This cement is then used for impregnating a yarn consisting of mineral and other fibres, which serves for the formation of a blank. The blank is subsequently heat treated under pressure so as to form the friction crown itself.

This aqueous cement has a viscosity which increases very rapidly over time. As a result firstly, only a very short time is available during which the cement is able to be used for impregnation purposes; and secondly, there are undesirable variations in the friction and wear resistance characteristics of the friction crowns which are then made.

DISCUSSION OF THE INVENTION

An object of the present invention is to provide a method of making a friction material, and more particularly a friction material for a friction crown for a dry friction clutch disc, which incorporates an aqueous cement that does not have the above mentioned drawbacks.

According to the invention in a first aspect, a method of making a friction material, the method includes an operation of impregnating with an aqueous impregnating cement a yarn based, on mineral fibres such as glass fibres, such that the aqueous cement contains latex together with a phenolic resin which is at least partly in the form of a phenolate.

The phenolate is preferably an alkaline phenolate. To this end, a strongly basic constituent (i.e. an alkali or other chemical base) is preferably added to the impregnating cement, before or after addition of phenolic resin.

The phenolic resin is preferably in the form of a powder.

The strongly basic constituent may for example be potash or soda.

Preferably, the proportion by weight of the strongly basic constituent, with respect to the phenolic resin, is in the range between 6 and 15%, and is preferably between 8 and 15%.

In a cement according to the invention, the length of time during which the cement is able to be used for impregnating the yarn so as to form the skeleton and blank of the friction crown, is considerably increased. In practice that time is in fact multiplied by a factor of the order of 10.

According to a feature of the invention, the manufacture of the impregnating cement includes the formation of a preliminary mixture containing fillers, the phenolic resin, the strongly basic constituent, and water, the method further including the addition of latex to the said preliminary mixture.

Besides the advantages noted above, stability has been observed in the physico-chemical characteristics of the cement during the whole of the time in which it is used, resulting advantageously in, an improved and constant quality in the final product, the friction crown itself.

In-depth analysis has revealed that with the methods conventionally used up to the present time, the addition of phenolic resin as a powder to the mixture containing latex causes water to be absorbed out of the latex. This leads to rapid increase in viscosity, and makes the cement unsuitable for impregnation purposes.

The use of resin in the form of a phenolate, or the addition of a strong base which is able to transform at least part of the resin into phenolate in accordance with the invention, avoids the above mentioned problems encountered in current practice.

According to the invention in a second aspect, a friction crown for a dry friction clutch disc it comprises yarn based on mineral fibres, such as glass fibres, together with organic fibres such as fibres of polyacronitryl or derivatives thereof and, an aqueous cement comprising a resin in the form of a phenolate, fillers, and latex. This friction crown is preferably made by a method according to the invention.

Further features and advantages of the invention will appear more clearly on a reading of the following detailed description of some embodiments of the method according to the invention, and the product produced by such methods, all of which are given by way of non-limiting example only. The description is further illustrated in the accompanying drawings.

BRIEF DESCRIPTION OF THE DRAWINGS

FIG. 3 is a graph relating to the performance of a clutch disc according to the invention, in which its coefficient of friction is plotted against the number of times the clutch in which it is incorporated is operated.

FIG. 4 relates to the same product, and is a graph in which working temperature is plotted against the number of operations of the clutch.

In FIG. 5, the speed of rotation in a centrifugation test is plotted against the inertia diameter of the crowns: this last mentioned parameter will be defined in the course of the description.

DESCRIPTION OF PREFERRED EMBODIMENTS OF THE INVENTION

Figure 1:
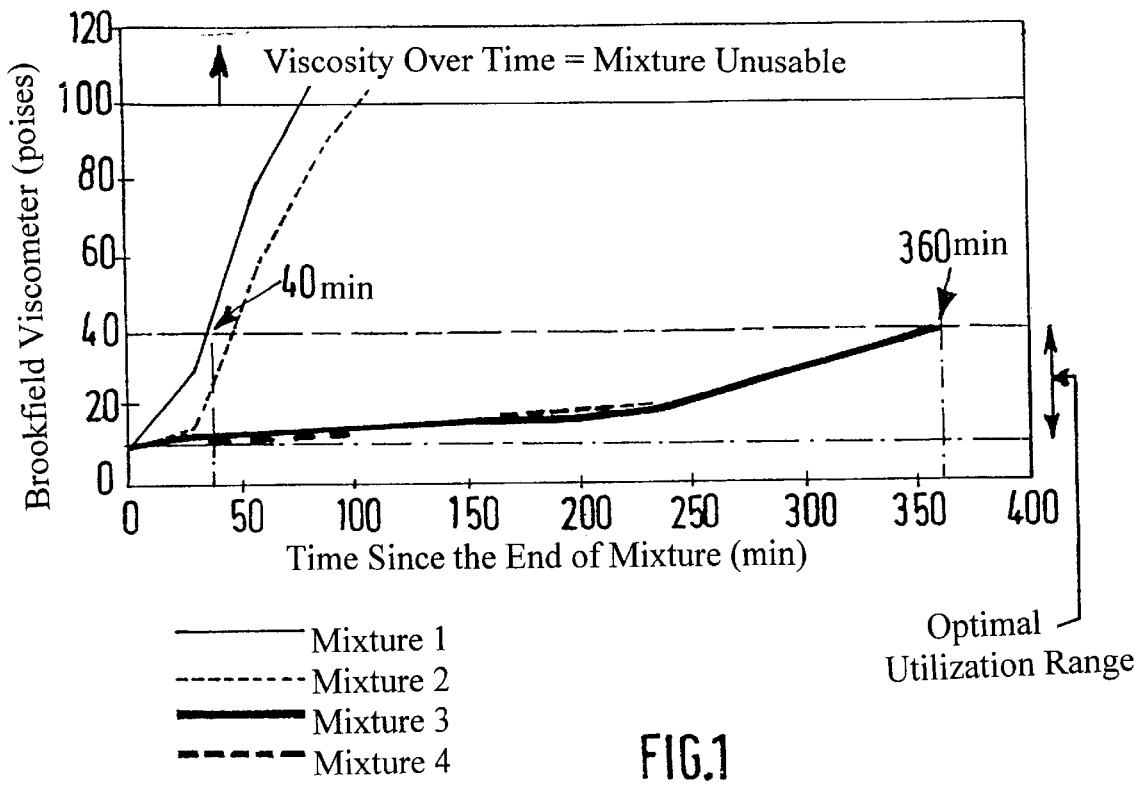
FIG. 1 is a graph showing how, in the prior art and in a process using a method according to the invention, the viscosity of three different mixtures of aqueous cements that can be used in the process of the invention, and (for comparison) one prior art mixture, varies with time.

Clutch crowns, that is to say circular friction liners for dry friction clutches for a motor vehicle, are made in the way now to be described.

An aqueous cement is made by mixing various constituents together. This mixing is preferably carried out in two steps, namely premixing and final mixing. Accordingly, the premixing step is first carried out by mixing together measured doses of phenolic and melamine-formol resins, potash (or, in a variant, soda or another suitable strong base), and water. The mixing time is determined in such a way that the mixture will be homogeneous, and so that the phenolic resin is fully dissolved.

In order to obtain the final mixture, latex is introduced into the premixture in such a way as to give a homogeneous final mixture.

A yarn is obtained which comprises threads of mineral fibre, such as glass fibre and organic fibres, for example fibres of polyacronitryl or its derivatives, together with metallic threads, which threads may comprise up to 75% of the weight of the final crown. This yarn is plunged into the cement so as to become impregnated with the cement. This impregnated yarn is then dried. A blank of a friction crown is then formed by distributing the impregnated yarn in lobes between an outer diameter and an inner diameter. This blank is subsequently heat treated under pressure; and a post-heating operation is preferably carried out so as to stabilise the product.

Various machining operations, such as straightening operations, formation of apertures in the blank, and, subsequently, an anti-dust treatment, can then be carried out as required. The clutch crowns obtained in this way are designed to be fitted on either side of an axially elastic support element of a clutch friction disc, or clutch wheel.

More precisely, four samples of cement have been made in the manner described above, from the constituents shown in Table 1 below, the proportions of which are expressed in parts by weight.

TABLE 1

| STARTING MATERIALS (parts by weight) | MIXTURE 1 (control test) | MIXTURE 2 | MIXTURE 3 | MIXTURE 4 |
|---|---|---|---|---|
| Powdered "Novolaque" | 100 | 100 | 100 | 100 |
| Caustic Potash | 0 | 6 | 10 | 15 |
| SBR Latex | 200 | 200 | 200 | 200 |
| Formol melamine resin | 220 | 220 | 220 | 220 |
| Carbon black | 90 | 90 | 90 | 90 |
| Sulphur | 53 | 53 | 53 | 53 |
| Barium Sulphate | 140 | 140 | 140 | 140 |
| Total water in mixture (added water plus water in the latex) | 335 | 450 | 515 | 515 |

Measurements of the change in the viscosity of the cement mixtures were made on extracts of these mixtures, using a Brookfield viscometer, at a temperature of 25° C. The measurements, showing an increase in viscosity over time, are shown in the curves in FIG. 1. Given that, in practice, correct impregnation of a yarn of the type described above is obtained with a cement having a viscosity which is lower than 100 poise, and which has an optimum value of about 40 poise, it can be seen in the curves in FIG. 1 that the period of time for which mixture 1 is usable from the time when the mixture is made, is very short. Mixture 1 is used as a "control" for the tests on the other three mixtures; mixture 1 is made in a way known in the art by using a phenolic resin, without any strongly basic substance being added.

As can be seen in FIG. 1, the utilisation time for mixture 1 is less than 40 minutes. By contrast, for mixture 2, the utilisation time is more than 40 minutes, while for mixtures 3 and 4 it is well over 100 minutes. Indeed, for mixtures 3 and 4 the viscosity remains within its optimum range, i.e. less than 40 poise, even after 360 minutes.

Complementary tests, which will not be described here, have enabled a preferred range, corresponding to a percentage by weight of the strong basic constituent with respect to the resin, to be determined as being between 8 and 15%. This enables the cement mixture to reach a pH value of the order of 9 to 10.

In some applications, it is preferred to use latex of the NBR type, which has greater thermal strength than latex of the SBR type.

Table 2, below, shows the composition of two further cement mixtures, mixtures 5 and 6.

TABLE 2

| STARTING MATERIALS (parts by weight) | MIXTURE 5 (control test) | MIXTURE 6 |
|---|---|---|
| Powdered "Novolaque" | 100 | 100 |
| Caustic Potash | 0 | 10 |
| NBR latex | 103 | 103 |
| Formol melamine resin | 83 | 83 |
| Carbon black | 36 | 36 |
| Sulphur | 10 | 10 |
| Barium Sulphate | 70 | 70 |
| Total water mixture (added water plus water in the latex) | 280 | 350 |

Figure 2:
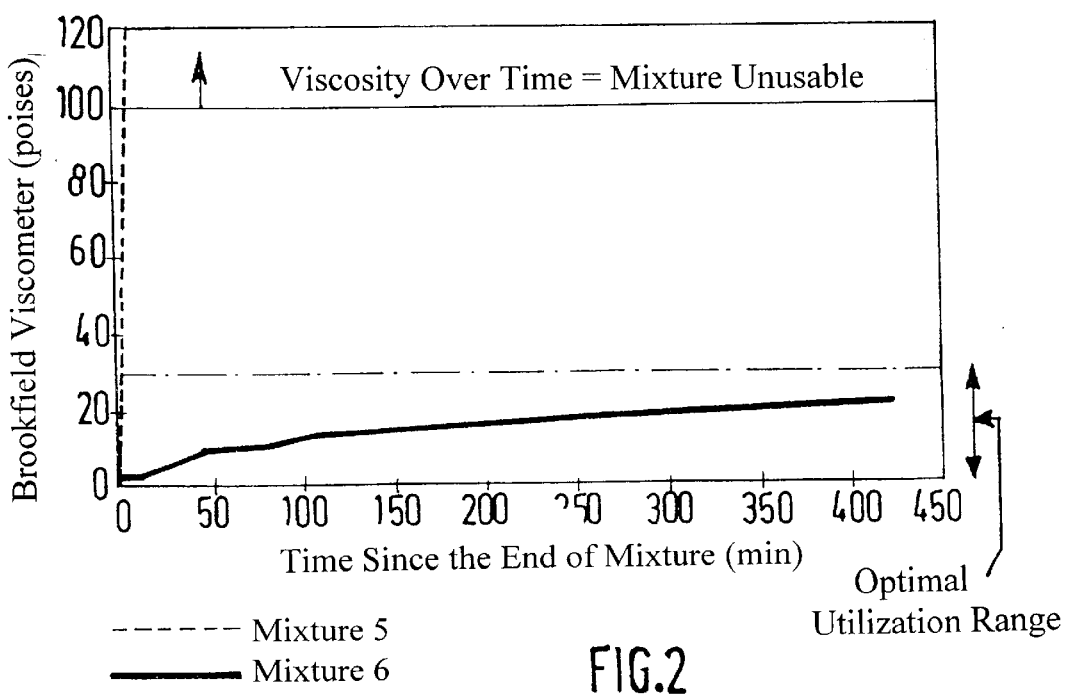
FIG. 2 is a graph, on the same basis as FIG. 1 but for two further examples of different aqueous cement mixtures.

The behaviour of viscosity over time for the mixtures set out in Table 2 is shown in FIG. 2, to which reference is now made. FIG. 2 is, like FIG. 1, a graph showing the variation of Viscosity with time, with zero time being the moment when mixing of the mixture concerned is completed, i.e. the instant at which the mixture is deemed to have been made. In this case, mixture 5 is used as a "control", there being no strongly basic substance in mixture 5. By contrast, mixture 6 contains 10 parts by weight of caustic potash. The tests illustrated in FIG. 2 were carried out at a temperature of 25° C. It is seen from this Figure that, whereas mixture 5 solidified almost at once, mixture 6 does not even reach the value of 30 poise viscosity after seven hours. On the contrary, it remains within the optimum range of viscosity for more than seven hours.

As to the type of latex used, the advantages of using a latex of the NBR type is illustrated by the comparative examples in Table 3 below, which sets out the compositions of two further cement mixtures, mixtures 7 and 8. In this connection, these two cement mixtures were made with compositions by weight which were identical except that mixtures 7 and 8 contained SBR and NBR latex respectively.

TABLE 3

| COMPOSITION BY WEIGHT | MIXTURE 7 | MIXTURE 8 |
|---|---|---|
| "Novolaque" | 13 | 13 |
| Caustic Potash | 1.3 | 1.3 |
| Formol melamine | 27 | 27 |
| SBR Latex | 24 | — |
| NBR Latex | — | 24 |
| Sulphur | 6.2 | 6.2 |
| Carbon black | 11 | 11 |
| Barium Sulphate | 17.5 | 17.5 |

Each of the above cements was used to impregnate yarns from which two pairs of clutch crowns were then made. Each pair of crowns was fitted to a clutch friction disc, and was subjected to a succession of clutch engagement and disengagement operations at regular intervals.

The values of the temperature of the crowns, their coefficients of friction and the number of operations of the clutch (i.e. cycles each consisting of one engagement operation and one disengagement) operations were measured. These measurements are shown in FIGS. 3 and 4, to which reference is now made.

It can be seen from FIG. 4 that the repeated clutch operations cause heating which is stabilised around 350 to 400° C. It can also be seen (from FIG. 3) that the coefficient of friction of the crowns containing SBR latex diminishes fairly steadily, and then more sharply after about 50 clutch operations. By contrast, for crowns containing NBR latex, the coefficient of friction is substantially stable, and does in fact increase after about 40 clutch operations.

In addition, during clutch operation very little noise is found to occur in the case of the liners containing NBR latex, this noise being substantially lower in strength than with the liners containing SBR latex.

Moreover, it has been found that the method of making clutch liners according to the invention permits great latitude in the formulation of the composition of the cement, and this wide scope enables the final product to comprise a friction material with various relevant properties. All of this enables a wide range of characteristics and performance to be supplied by clutch friction crowns according to the invention. By way of example, Table 4 below shows some particularly significant examples of variations in composition. Table 4 shows seven examples, denoted as F1 to F7 respectively.

TABLE 4

| STARTING MATERIALS | COMPOSITIONS (by weight) | | | | | | |
|---|---|---|---|---|---|---|---|
| | F1 | F2 | F3 | F4 | F5 | F6 | F7 |
| "Novolaque" | 21 | 13 | 24 | 24 | 18.6 | 19.5 | 24 |
| Potash | 2.1 | 1.3 | 2.5 | 2.5 | 1.9 | 2 | 2.4 |
| Formol melamine | 25 | 27 | 20 | 20 | 15.5 | 16 | 8 |
| Principal latex (SBR or NBR) | 21 | 24 | 25 | 20 | 19.5 | 20 | 34 |
| Secondary latex (halobutyls, NR, vinylpyridine) | | | | | 5 | | |
| Carbon black | 11 | 11 | 9 | 9 | 7 | 7 | 10.5 |
| Sulphur | 2.4 | 6.2 | 2.5 | 2.5 | 2 | 2 | 3.6 |
| Accelerators | | | | | | 0.5 | |
| Barium Sulphate | 17.5 | 17.5 | 17 | 17 | 13 | 14 | 17.5 |
| Kaolin | | | | | | 7 | |
| Graphite | | | | | | 7 | |
| Cardolite | | | | | 3 | | |
| Calcium Silicate | | | | | 3.1 | | |

TABLE 4-continued

| STARTING MATERIALS | COMPOSITIONS (by weight) | | | | | | |
|---|---|---|---|---|---|---|---|
| | F1 | F2 | F3 | F4 | F5 | F6 | F7 |
| Mica | | | | | | 3 | |
| Iron oxides | | | | | | 3 | |
| Zirconium | | | | | | 1 | |
| Antimony sulphide | | | | | 3.1 | | |
| Fluorine | | | | | 2.3 | | |
| Calcium carbonate | | | | | | 4 | |
| Magnesium silicate | | | | | | 2.5 | |
| Petroleum coke | | | | | | 2.5 | |

The invention also enables formation of cements that contain an increased proportion of useful constituents with respect to the amount of solvent present. This can be measured by making dry extracts of useful constituents which excess 50% of the weight of the cement, as compared with 35% and less in the present state of the art.

Advantages of the invention over the prior art are, firstly, a richer impregnation of the yarn, and secondly faster drying of the yarn after it has been impregnated.

In particular, the invention enables a composite yarn, comprising at least one thread of elementary textured glass fibre, and preferably from 1 to 3 threads textured from 600 to 5000 tex, to be impregnated. With the cement made according to the invention, generally as described in the examples above, this type of yarn enables improved impregnation. As a consequence the clutch crown made from this impregnated yarn has an increased mechanical resistance against the effects of centrifugal force.

In order to make suitable comparisons, three clutch crowns were made, and were given through holes allowing fastening on a clutch friction wheel or clutch disc by riveting.

The first crown was made from a conventional material, an untextured yarn impregnated with a cement in a chlorinated solvent. The second clutch crown was made from an untextured yarn which was impregnated with a cement in accordance with mixture 3 described above in Table 1 and FIG. 1. The third clutch crown was made from a composite yarn which consisted of two threads textured at 2500 tex, impregnated with a cement in accordance with mixture 3.

Figure 5:
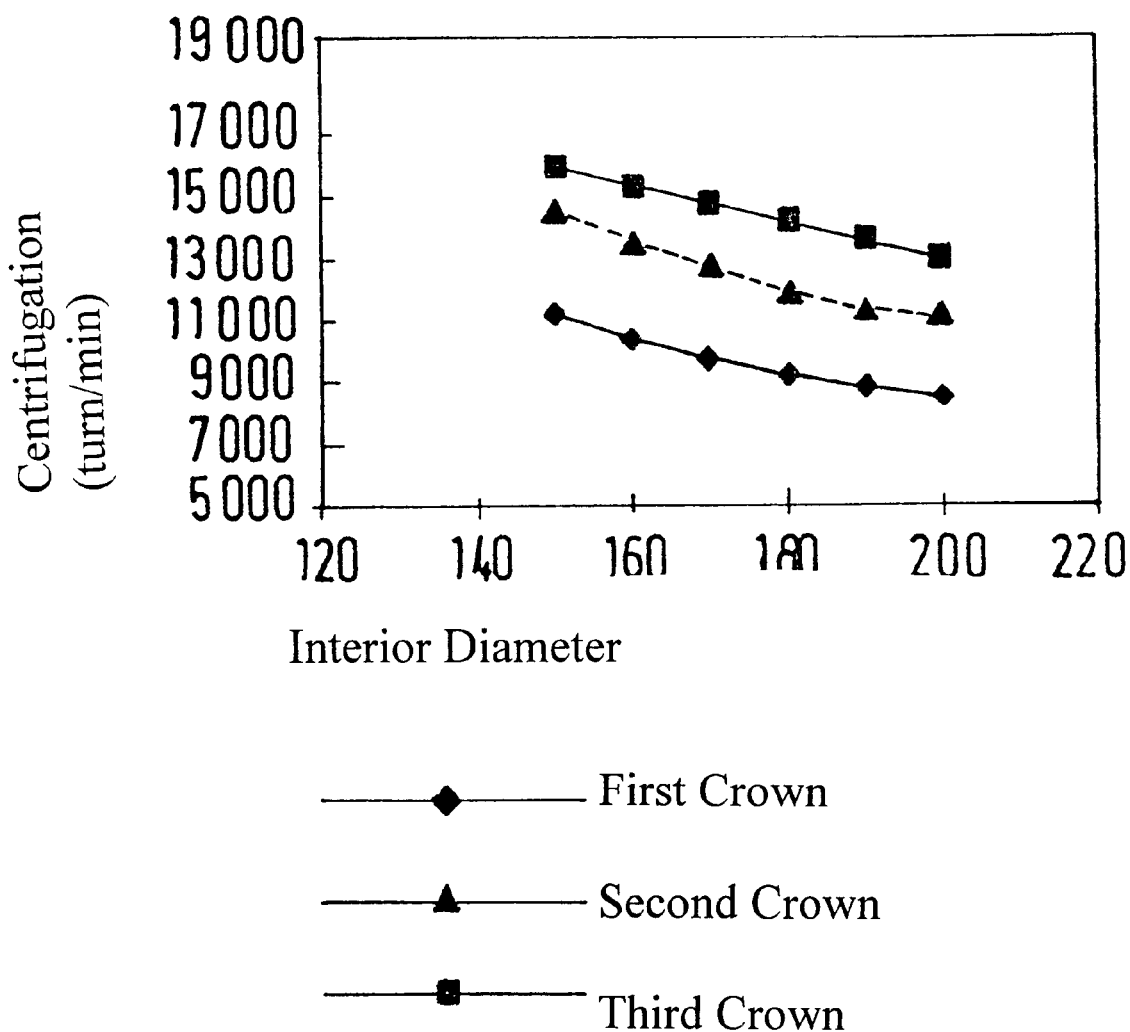
FIG. 5 is a graph in which two clutch crowns according to the invention are compared with a crown of the prior art.

In this connection reference is made to FIG. 5, showing the results of a centrifugation test in which the above mentioned three clutch crowns were rotated at different speeds in order to subject the crowns to centrifugal force of varying value. FIG. 5 shows the threshold values, i.e. the rotational speed in revolutions per minute at which the test piece ruptured under heat, as a function of its inertia diameter, which, it will be recalled, may be defined as follows:

$$DI = \sqrt{\frac{1}{2}(D^2 - d^2)}$$

where D and d are the outer and inner diameters, respectively, of the crown, and DI is the inertia diameter itself.

It will be seen from the foregoing that the invention gives a substantial improvement in centrifugal strength of the clutch liner, which is particularly high when a textured yarn is combined with a strongly basic aqueous cement. If this arrangement is then combined with the use of NBR latex, all of the advantages discussed above are found.

What is claimed is:

1. A friction liner for a dry friction clutch disc, said friction liner comprising:

yarn comprising mineral fibres or organic fibres; and an impregnating cement comprising latex, a phenolic resin and a strongly basic constituent, wherein the strongly basic constituent is in proportion to the phenolic resin in the range between approximately 6% and approximately 15% by weight.

2. The friction liner according to claim 1 wherein:

said mineral fibres are glass fibres; and said organic fibres are polyacronitryl fibres or fibres that are derivative of polyacronitryl fibres.

3. A clutch friction disc comprising the friction liner of claim 1.

4. A friction liner according to claim 1, wherein the strongly basic constituent is potash or soda.

5. A friction liner according to claim 1, wherein the latex is NBR latex or SBR latex.

6. A friction liner according to claim 1, wherein the phenolic resin is at least partly in the form of a phenolate.

7. A friction liner according to claim 1, wherein the yarn includes at least one textured elementary glass fibre thread.

8. A friction liner according to claim 1, wherein the texture of the textured glass fibre thread is in the range between approximately 600 and approximately 5000 tex.

9. A friction liner according to claim 1, wherein the yarn includes a metallic thread.

* * * * *